US007952782B2

(12) United States Patent
Huang

(10) Patent No.: US 7,952,782 B2
(45) Date of Patent: May 31, 2011

(54) OBSERVING DEVICE AND METHOD TO OBSERVE A THREE-DIMENSIONAL FLOW FIELD

(75) Inventor: Po-Hsuan Huang, Taipei (TW)

(73) Assignee: National Applied Research Laboratories, Taipei (TW)

( * ) Notice: Subject to any disclaimer, the term of this patent is extended or adjusted under 35 U.S.C. 154(b) by 406 days.

(21) Appl. No.: 12/214,750

(22) Filed: Jun. 19, 2008

(65) Prior Publication Data

US 2009/0231660 A1    Sep. 17, 2009

(30) Foreign Application Priority Data

Feb. 21, 2008    (TW) ................ 97106154 A

(51) Int. Cl.
*G02B 26/08*    (2006.01)

(52) U.S. Cl. .................................................. 359/216.1
(58) Field of Classification Search ............... 359/216.1; 250/559.25, 234–236
See application file for complete search history.

(56) References Cited

U.S. PATENT DOCUMENTS 5,945,685 A * 8/1999 Imaino et al. ............ 250/559.45
* cited by examiner

*Primary Examiner* — Euncha P Cherry
(74) *Attorney, Agent, or Firm* — Haverstock & Owens LLP

(57) ABSTRACT

An observing device for observing a flow field in a detection space is provided. The observing device includes a light source generating a light beam, a light-deflecting device deflecting the light beam, and a light sheet-generating component receiving the light beam deflected by the light-deflecting device and generating a light sheet in the detection space corresponding to the deflected light beam.

20 Claims, 7 Drawing Sheets

The lens in Fig. 4, which has no curvature along Z direction

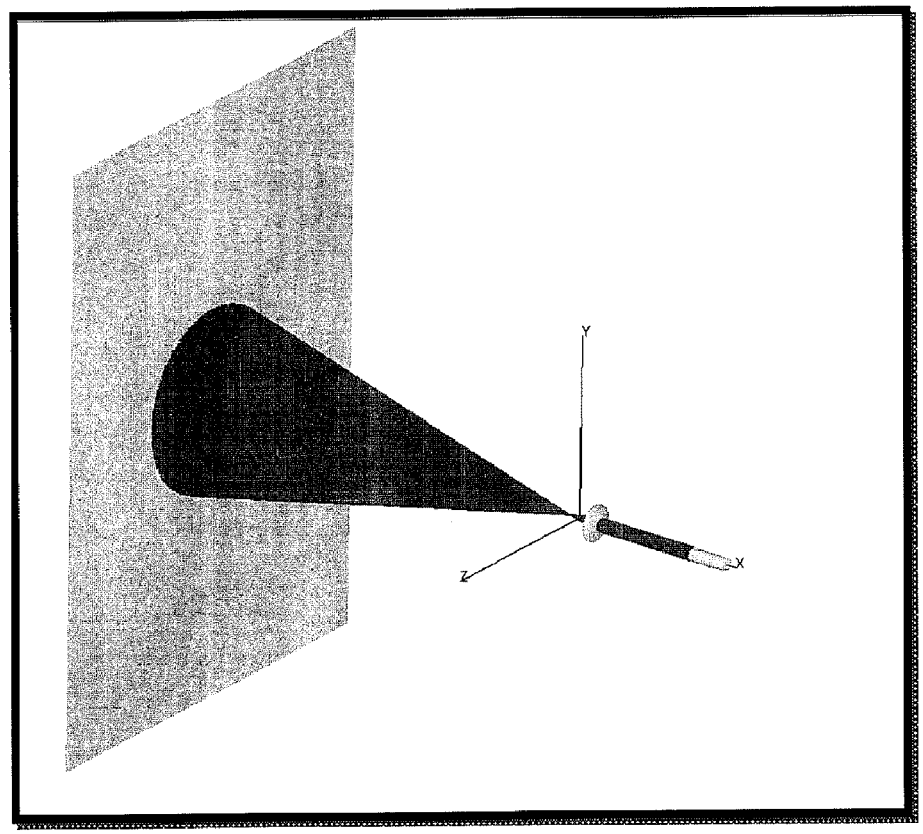
Fig. 1  A laser beam passes axially symmetric lens and is projected on a screen.
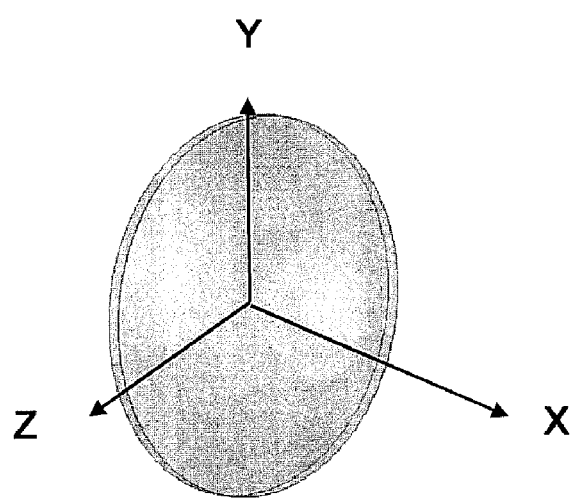
Fig. 2  An axially symmetric lens

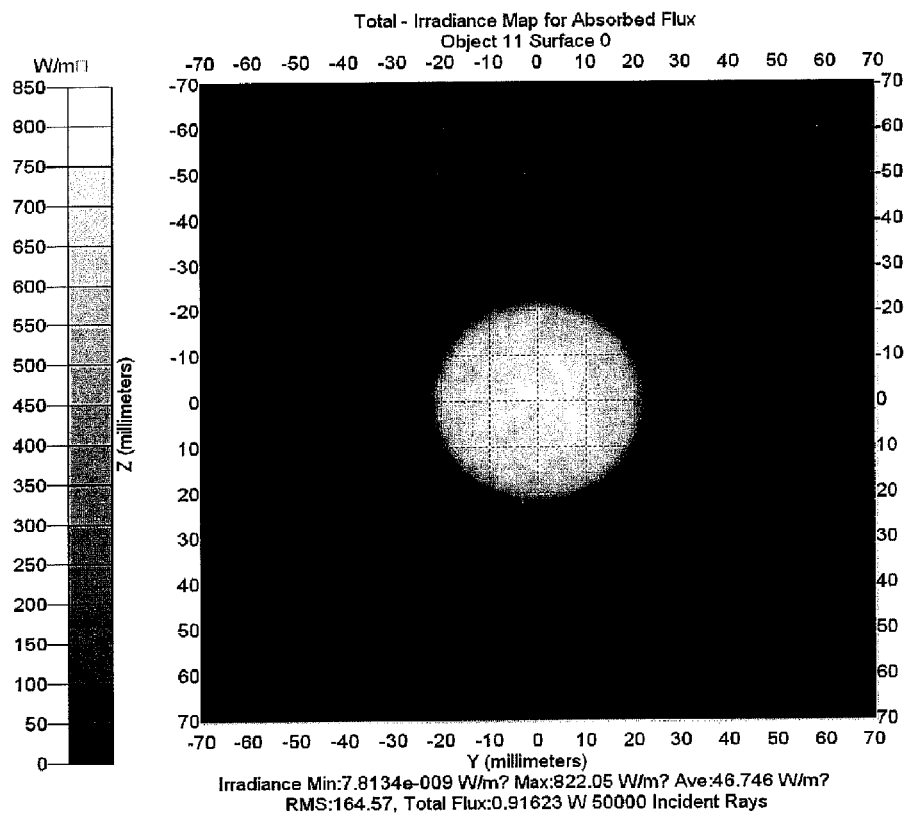
Fig. 3 The projected illuminance in Fig. 1
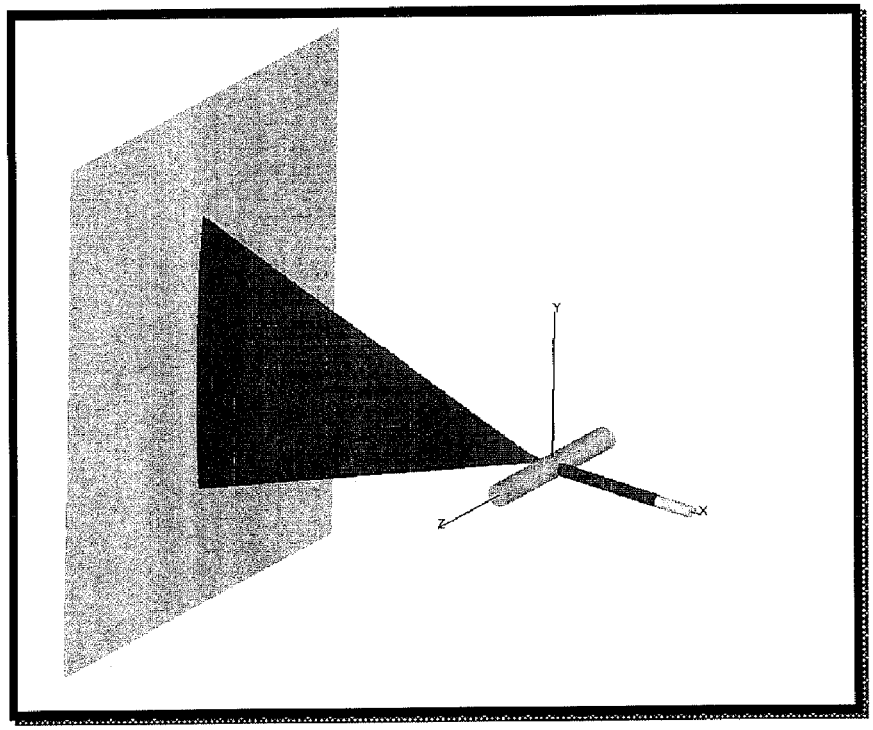
Fig. 4 A laser beam passes axially asymmetric lens and is projected on a screen.

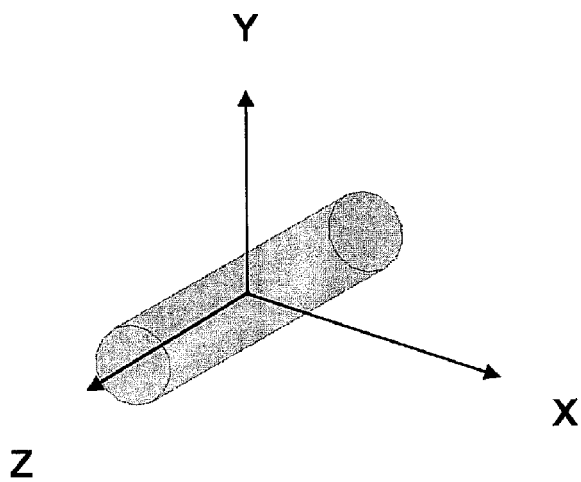
Fig. 5 The lens in Fig. 4, which has no curvature along Z direction
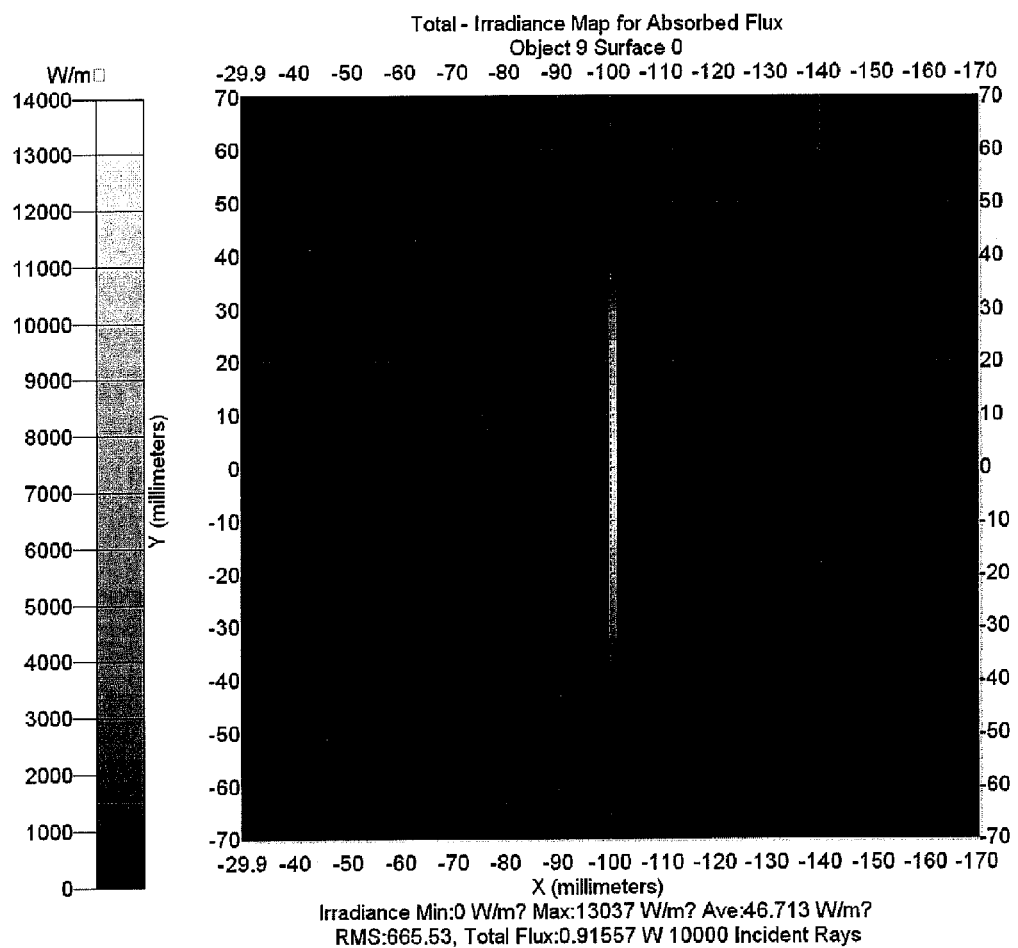
Fig. 6 The projected illuminance in Fig. 4

OBSERVING DEVICE AND METHOD TO OBSERVE A THREE-DIMENSIONAL FLOW FIELD

FIELD OF THE INVENTION

The present invention relates to an observing device and method, and more particularly to an observing device and method to observe a three-dimensional flow field.

BACKGROUND OF THE INVENTION

In the field of fluid dynamics, the experiments of the wind tunnel and water tunnel are essential to design, analyze and research in flow machines. Based on such experiments, the variations of a flow around a test object in the flow field can be observed directly. Therefore, in order to visualize the flow field, an appropriate observing method is necessary. The most direct observing method is a visual observing method, i.e. an observing method via images.

Please refer to FIG. 1, which is a diagram showing an observing device and method for observing a flow field according to the prior art. In FIG. 1, the region surrounded by dotted lines indicates a flow field 3. Generally, no matter in a wind tunnel or a water tunnel experiment, when one skilled in the art wants to realize the flow dynamics at a specific position, particles will be dropped into the upstream of the specific position in the flow field. For example, for a stable flow field in a wind tunnel, smoke will be released therein, and for a water tunnel, a dye will be suspended therein. Meanwhile, the moving image of the particles are captured and recorded by a camera 1. In order to facilitate the observation, a light sheet 4 generated by a light sheet generator 2 for traversing the flow field 3 and thus generating a light sheet section 40 in the flow field 3 is provided in the prior art. Since the light axis of the camera 1 is perpendicular to the plane of the light sheet section 40, it is facile for the camera 1 to focus on each point on the light sheet section 40. Furthermore, since what is launch into the flow field 3 is a light sheet 4, the light sheet section 40 is illuminated particularly. Therefore, the particles (not shown) suspended in the light sheet section 40 will be illuminated and revealed, which are helpful to take images of the light sheet section 40 by the camera 1.

Please refer to FIG. 2, which is a diagram showing the actual operation of the observing device according to FIG. 1. A test object 30 configured in the flow field 3 is in a shape of a wing. When the light sheet crosses the flow field 3 and a light sheet section 40 is generated, a wing-shaped section 30' is generated on the test object 30. Since the test object 30 is merely varied in the directions of X-axis and Y-axis of the plane of the wing-shaped section 30' and constant in the direction of Z-axis thereof, only the variations in the directions of X-axis and Y-axis, i.e. the X-Y plane, are needed to be observed instead of in the direction of Z-axis. Accordingly, the light sheet section 40 crossing the flow field 3 is in a direction for capturing the image of the X-Y plane, and the flow in the flow field 3 passes through the test object 30 along a flowing direction 31. Under the condition that the flow field 3 is stable, pathlines 31' representing the trajectory of particles released into the flow field 3 and varied by the flow could be observed, and thereby the variations of the flow passing through the test object 30 are realized.

However, in fact, the test object to be observed in the wind tunnel or the water tunnel usually varies in all the three directions. Supposing the test object 30 in FIG. 2 is varied in Z-direction as well, the flow will have a component in Z-direction when passing through the test object 30. However, for the conventional device in FIG. 1, even if the flow field 3 is maintained in stable, the flow phenomenon in Z-direction still cannot be visualized. Likewise, the respective flow phenomenons in two X-Y planes with different Z-values are hard to be distinguished therebetween by the visualization thereof, and thus an analysis for the two planes is hard to be made.

Accordingly, in order to establish a complete observing result of a three dimensional flow field, a whole new method and apparatus for taking images of the flow field are necessary, and the purpose thereof is to visualize a flow field on different planes nimbly, quickly and almost simultaneously.

Hence, because of the defects in the prior arts, the inventors provide an observing device and method to effectively overcome the demerits existing in the prior arts.

SUMMARY OF THE INVENTION

It is an aspect of the present invention to provide an observing device and method for a three-dimensional flow field having the facility in the visualization and the capability of integrating the analysis data of each point in the three-dimensional flow field to output a complete and reliable analyzed result.

In accordance with an aspect of the present invention, an observing device for scanning a flow in a detection space is provided. The observing device comprises a light source generating a light beam, a light-deflecting device deflecting the light beam, and a light sheet-generating component receiving the light beam deflected by the light-deflecting device and generating a light sheet in the detection space corresponding to the deflected light beam.

Preferably, the observing device further comprises an adjusting lens configured between the light-deflecting device and the light sheet-generating component to collimate the light beam deflected by the light-deflecting device, and an image detector readjusting a focus thereof according to a distance from the image detector to the light sheet for recording an image of the flow.

Preferably, the light sheet traverses an object in the detection space, and the light-deflecting device comprises a reflecting device for deflecting the light beam by moving the reflecting device.

Preferably, the reflecting device comprises a rotator, and a plurality of reflecting mirrors surrounding the rotator for deflecting the light beam by rotating the rotator.

Preferably, the plurality of reflecting mirrors is parallel to tangent lines of a perimeter of the rotator.

Preferably, the light-deflecting device comprises a cam and the light source is configured thereon for deflecting the light beam by revolving the cam.

Preferably, the light-deflecting device comprises a cam and a rocker arm, the cam is contacted with the rocker arm and the light source is configured on the rocker arm so as to deflect the light beam by revolving the cam.

Preferably, the observing device further comprises a rocker arm with the light source configured thereon, a connecting rod, and a drive wheel connected to the rocker arm through the connecting rod for reciprocating the rocker arm by rotating the drive wheel.

In accordance with another aspect of the present invention, an observing device for scanning a flow in a detection space is provided. The observing device comprises a light sheet generator for generating a light sheet in the detection space, and a moving device connected with the light sheet generator for moving the light sheet generator along a direction, thereby the light sheet is produced along the direction.

Preferably, the observing device further comprises an image detector readjusting a focus thereof according to a distance from the image detector to the light sheet for recording an image of the flow.

Preferably, the image detector is positioned for facing the light sheet.

Preferably, the focus of the image detector is synchronously readjusted to comply with a movement of the light sheet generator.

Preferably, the light sheet traverses an object in the detection space, and the moving device comprises a track for moving the light sheet generator.

Preferably, the direction is perpendicular to the light sheet.

Preferably, the direction is perpendicular to a flowing direction of the flow.

In accordance with a further aspect of the present invention, a method for scanning a flow in a detection space is provided. The method comprises steps of generating a light sheet in the detection space, and scanning the detection space by successively producing the light sheet along a direction.

Preferably, the method for scanning a flow in a detection space further comprises steps of providing a light sheet generator, and providing a collimated light beam to the light sheet generator along the direction for successively producing the light sheet, wherein the light sheet traverses an object in the detection space.

Preferably, the method for scanning a flow in a detection space further comprises a step of moving the light sheet generator along the direction parallel to a flowing direction of the flow so as to successively produce the light sheet along the direction.

Preferably, the method for scanning a flow in a detection space further comprises steps of providing an image detector, and recording the scanning of the detection space by using the image detector for obtaining an image of the flow.

Preferably, the method for scanning a flow in a detection space further comprises a step of readjusting a focus of the image detector when the light sheet is successively produced during the scanning period of the detection space.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In order to achieve a better effect on the flow field visualization, a concept of moving a light sheet is proposed in the present invention. The purpose of the present invention is to visualize different planes nimbly, quickly and almost simultaneously by the method of moving a light sheet. As for the flow field on the whole, a three-dimensional flow field is scanned by the present invention. Namely, the present invention is an observing device for observing a three-dimensional flow field.

First Embodiment

Figure 3:
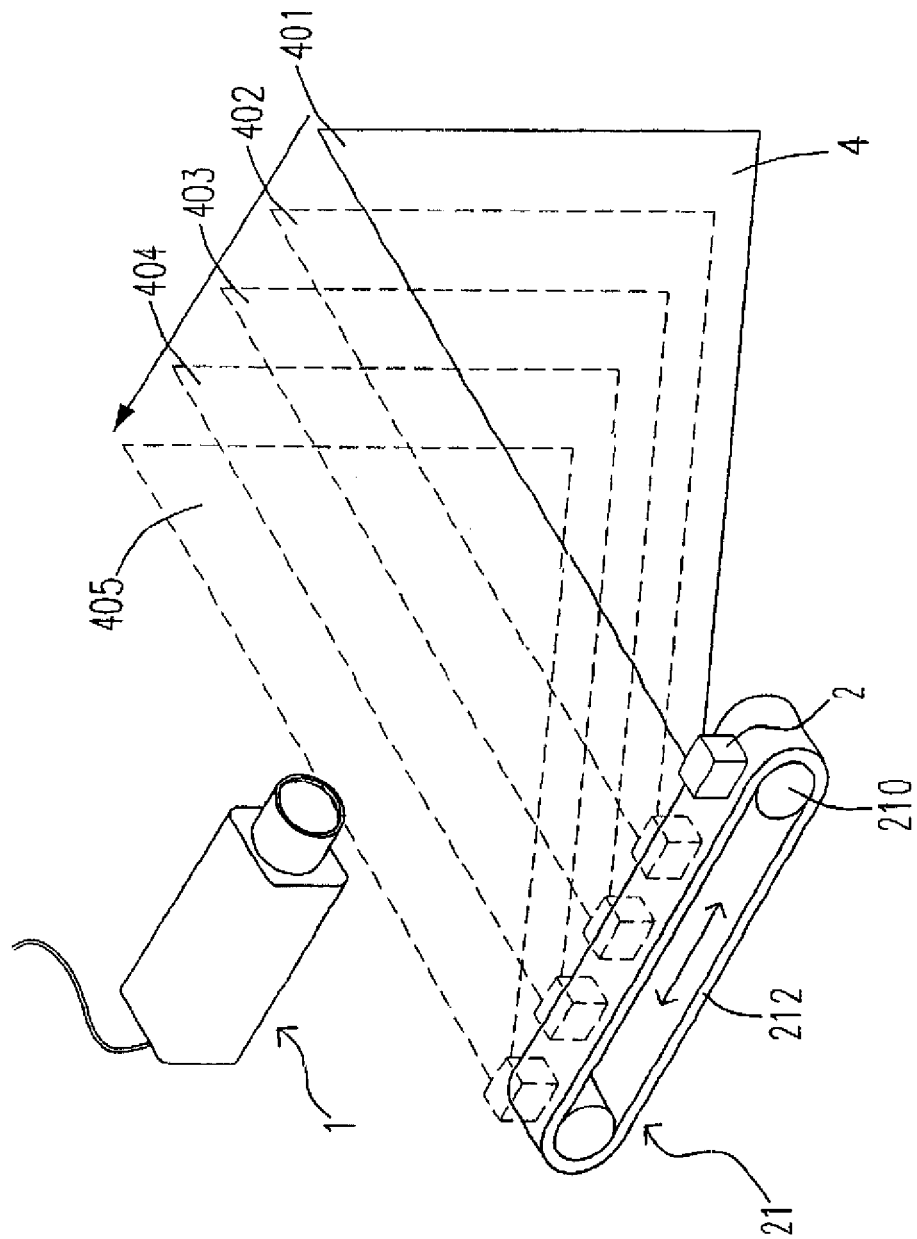
FIG. 3 is a diagram showing an observing device for observing a three-dimensional flow field according to a first embodiment of the present invention.

Please refer to FIG. 3, which is a diagram showing an observing device for observing a three-dimensional flow field according to a first embodiment of the present invention. The observing device according to the first embodiment of the present invention comprises a moving device 21 and a light sheet generator 2 configured thereon, thereby moving the light sheet generator 2. Generally, a direct method for moving the light sheet generator 2 is to configure the light sheet generator 2 on a track (not shown), like a train on a railroad. Since the convenience of the cyclic operation is taken into account in the first embodiment, a belt mechanism is adopted as the moving device 21 to carry the light sheet generator 2. The belt mechanism comprises a pulley set 210 and a belt 212, wherein the belt 212 wraps around the pulley set 210 and the light sheet generator 2 is configured on the belt 212. According to the configuration of the first embodiment, the light sheet generator 2 can scan a flow field cyclically along one direction, wherein the scan for the opposite direction could be achieved by changing the rotating direction of the pulley set 210. The belt 212 in the first embodiment could be a leather belt, a track or a chain belt.

Please refer to FIG. 3 again, wherein five positions 401-405 of a light sheet 4 are presented for illustrating the relationships between each component of the observing device of the first embodiment. In general, in order to achieve the optimal visualizing effect, i.e. the lowest compensation for the error, the variation or any required situations, the light axis of the camera 1 is perpendicular to the plane of the light sheet 4 at each position 401-405. In other words, the light axis of the camera 1 is parallel to the normal vector of the light sheet 4, and thus the front image of the section of the light sheet 4 at each position 401-405 could be taken without additional adjustment. If the angle between the light axis of the camera 1 and the normal vector of the plane of the light sheet 4 is not zero, an additional compensation for the taken images of the flow field is necessary. Therefore, the angle between the light axis of the camera 1 and the normal vector of the plane of the light sheet is zero in normal condition unless specific condition or limitation is required. For FIG. 3, the variations of the flow field on the plane along the direction of the light axis of the camera 1 are the visualizing emphasis. Accordingly, when the light sheet generator 2 is successively moved, thereby moving the light sheet 4, the direction that the camera is pointing for taking the images is the direction of the light axis and the visualization. Since the light sheet 4 is moved along a direction of approaching to or leaving from the camera 1, the focus of the camera 1 needs to be readjusted according to a distance from the camera to the light sheet 4. In order to readjust the focus immediately in accordance with the movement of the light sheet 4, the focusing system (not shown) in the camera 1 is designed to be synchronous with the moving device 21. Based on the foregoing design, the focus of the camera 1 can be readjusted directly without determining the distance to the light sheet 4. Namely, when the light sheet 4 is at the first position 401, the light sheet generator 2 must be in a specific position at the moment. Since the light sheet generator 2 is configured on the moving device 21 and the camera 1 is synchronous with the moving device 21, the camera 1 is able to focus on the light sheet at the first position 41. Likewise, when the moving device 21 moves the light sheet generator 2 and thereby moves the light sheet 4 to the second position 402, the third position 403, the fourth position 404 or the fifth position 405 respectively, the camera 1 is still able to readjust the focus accurately and quickly. For one moment, there is only one light sheet 4; however for a period of time, there is a plurality or even an unlimited plurality of light sheets. Based on the above, the present invention is able to scan a space by the movement of a light sheet.

Second Embodiment

Figure 4:
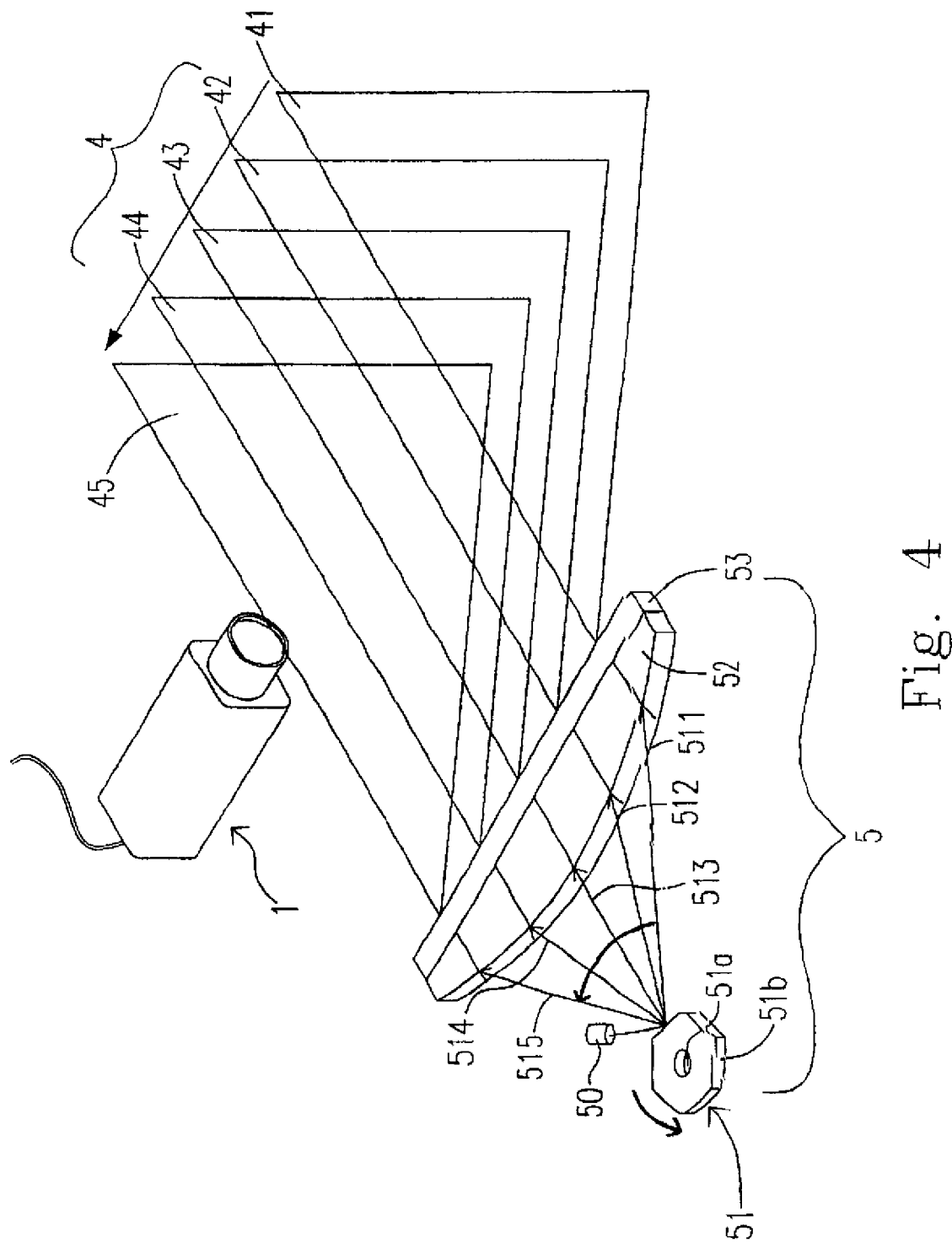
FIG. 4 is a diagram showing an observing device for observing a three-dimensional flow field according to a second embodiment of the present invention.

Please refer to FIG. 4, which is a diagram showing an observing device for observing a three-dimensional flow field according to a second embodiment of the present invention. With regard to the first embodiment, there might exist some problems of machine consumption and tremble in the moving device 21. Therefore, as shown in FIG. 4, the principle of the light sheet generator 5 is used in the second embodiment. The principle of the light sheet generator 5 is to emit a light beam to a light sheet-generating component 53, which spreads the light beam into a light sheet. When the light beam is emitted to different positions on the light sheet-generating component 53, light sheets 4 are generated at different positions. Therefore, the scheme of changing the positions where the light sheets 4 are generated in FIG. 4 is achieved by changing the incident positions of the light beam to the light sheet-generating component 53, thereby simulating the effect of moving a light sheet and finally achieving the purpose of scanning a flow field in a three-dimensional space.

Please refer to FIG. 4 again. A light-deflecting device 51 is configured in the second embodiment for changing the incident positions on the light sheet-generating component 53. In the second embodiment, the light-deflecting device 51 is a reflecting device 51, which is movable for deflecting a light beam. The movement of the reflecting device 51 is usually performed by a rotation achieved by a revolving shaft 51a. When the light beam is emitted from a light source 50 to the reflecting device 51, the reflecting device 51 will reflect the light beam to the light sheet-generating component 53. Since the reflecting device rotates successively, the incident angles of the light beam to the reflecting device 51 are varied according to the rotation, and thus the reflecting angles thereof are changed. Since the reflecting angles of the light beam are changed, the reflected light beams are emitted to different positions on the light sheet-generating component 53 for achieving the simulation of moving a light sheet 4.

In addition, since the rotation of the reflecting device 51 is at a fixed point, the incident angles of the reflected light beam to the different positions on the light sheet-generating component 53 are different. Accordingly, an adjusting lens 52 is configured between the reflecting device 51 and the light sheet-generating component 53 to receive and collimate the reflected light beams. The reflected light beams with different incident angles to the adjusting lens are emitted to the light sheet-generating component 53 at the same incident angle, and thereby the light sheets 4 generated at different positions in the flow field are parallel. The adjusting lens 52 also adjusts the transverse moving speed of light spots, i.e. the adjusted light beams in the light sheet-generating component 53 move at the same speed. Based on the above, no matter at what incident angles the reflected light beam from the reflecting device is emitted to the adjusting lens 52, the light sheets 4 will move at the same speed.

Please refer to FIG. 4 again. In order to achieve the purpose of scanning the flow field (not shown) successively in one direction, besides the revolving shaft 51a, the reflecting device 51 further comprises a plurality of reflecting mirrors 51b, which are configured around the revolving shaft 51a. The plurality of reflecting mirrors 51b move in accordance with the rotation of the revolving shaft 51a, thereby deflecting the light beam emitted from the light source 50. In general, the planes of the plurality of reflecting mirrors 51b are parallel to tangent lines of the perimeter of the revolving shaft 51a. In other words, the normal vectors of the planes of the plurality of reflecting mirrors 51b are parallel to the radial directions of the revolving shaft 51a. In appearance, the reflecting device 51 looks like a polygonal reflecting-mirror with a revolving shaft 51a, or a polygonal cylinder with a revolving shaft 51a passing through the core thereof, wherein the reflecting mirrors are configured on the side faces of the polygonal cylinder or the side faces themselves are reflecting mirrors.

Accordingly, when the reflecting device 51 rotates, the angles between the light beam and the reflecting mirrors 51b are changed continuously. Therefore the incident angles of the light beam to the reflecting device 51 are varied continuously and thus the reflecting angles thereof are varied as well. In order to simplify the content in FIG. 4, the reflected light beam is presented by a first reflected light beam 511, a second reflected light beam 512, a third reflected light beam 513, a fourth reflected light beam 514, and a fifth reflected light beam 515, wherein the reflecting angles of the five light beams are different and thus they are reflected to different positions of the adjusting lens 52. The five light beams passing through different positions of the adjusting lens 52 are emitted to the light sheet-generating component 53 and form light sheets 4 at different positions in the flow field. Namely, a first light sheet 41 is generated at a first position, a second light sheet 42 is generated at a second position, a third light sheet 43 is generated at a third position, a fourth light sheet 44 is generated at a fourth position, and a fifth light sheet 45 is generated at a fifth position. For one moment, there is only one light sheet; however for a period of time, it could be considered as a moving light sheet or a plurality light sheets existing in different time points and at different positions.

Figure 5:
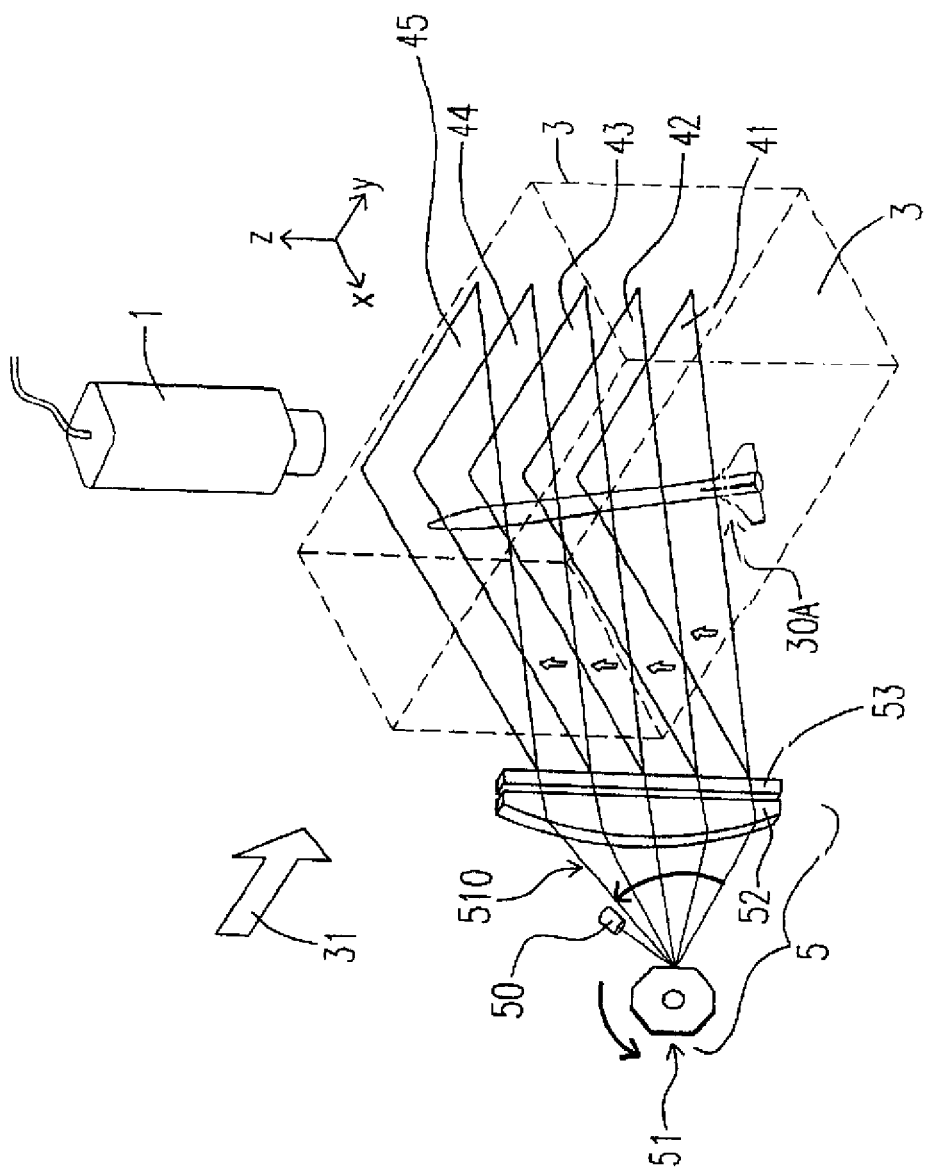
FIG. 5 is a diagram showing the operation of the observing device of the second embodiment in FIG. 4.

Please refer to FIG. 5, which is a diagram showing the operation of the observing device of the second embodiment in FIG. 4. The camera 1 is configured to look down at the flow field 3. Namely, the direction of the light axis of the camera 1 is parallel to Z-axis, i.e. the "depth" dimension, of the flow field 3 so as to visualize the variations of the flow field in X-axis and Y-axis. In this embodiment, a test object 30A is configured in the flow field 3 and it is apparent there is an angle, i.e. the angle of attack, between the axis direction of the test object 30A and the flowing direction 31 of the flow in the flow field 3. Therefore, the Z-axis value of the test object 30A is varied, and the camera 1 can be used to visualize the variations of the flow in each X-Y plane with respective Z-axis value when the flow is passing by the test object 30A. For FIG. 5, since the reflecting device 51 rotates in a counterclockwise direction, the reflected light beams are emitted to the adjusting lens 52 from bottom up and are transformed to light sheets, such as the first light sheet 41, the second light sheet 42, the third light sheet 43, the fourth light sheet 44 and the fifth light sheet 45, by the light sheet-generating component 53. The flow phenomenon in the five X-Y planes with different Z-axis values can be obtained via the five light sheets 41-45. Meanwhile, the effect resulting from the test object 30A to the flow field 3 in the five X-Y planes with different Z-axis values also can be known by the existence of the test object 30A.

Figure 6:
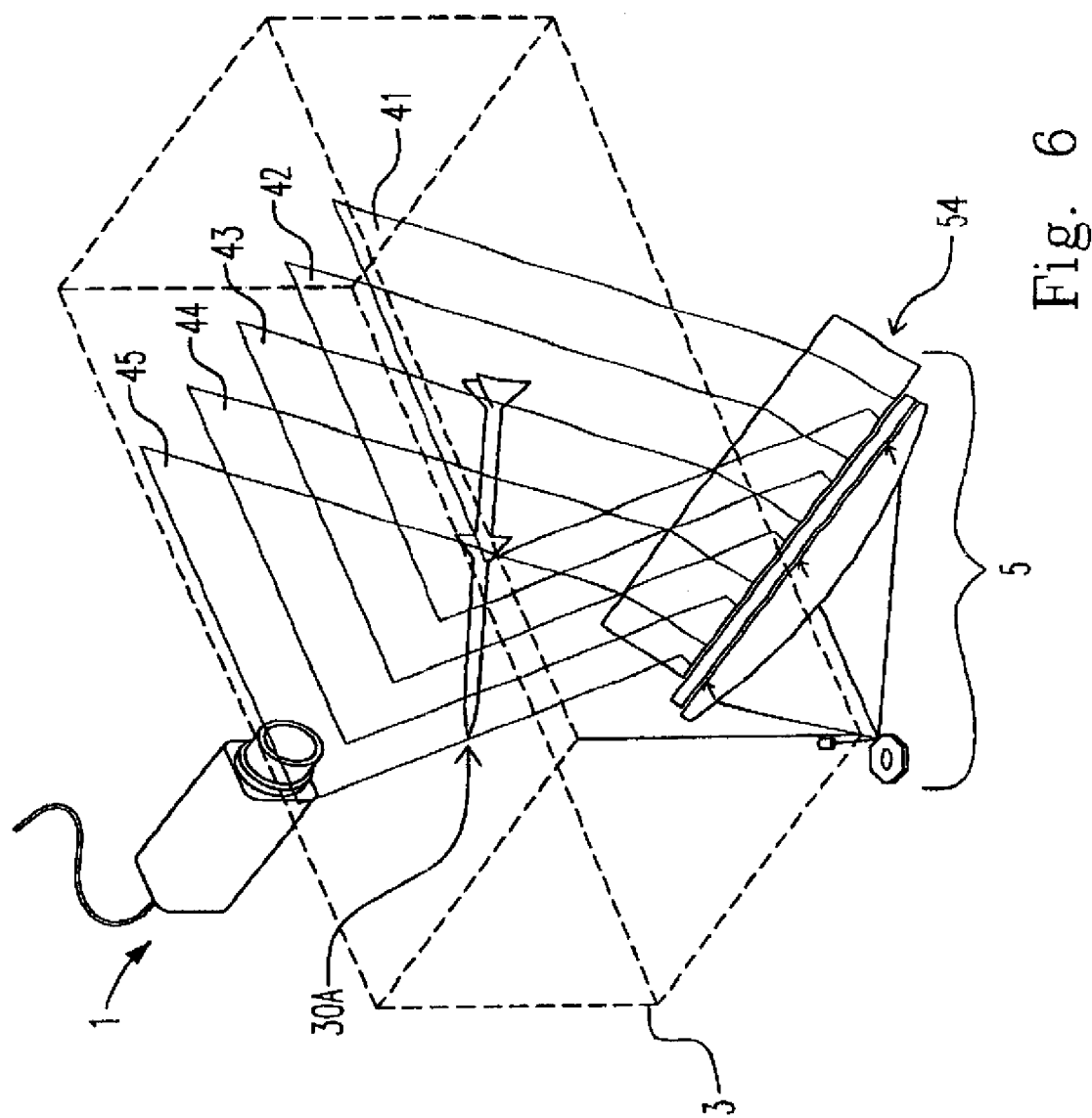
FIG. 6 is a diagram showing the second embodiment of FIG. 4 with partial modifications.

Please refer to FIGS. 4 and 6, wherein FIG. 6 is a diagram showing the second embodiment of FIG. 4 with partial modifications. Since the reflecting angles of the reflected light beams, such as the first reflected light beam 511, the second reflected light beam 512, the third reflected light beam 513, the fourth reflected light beam 514, and the fifth reflected light beam 515, from the reflecting device 51 are different, an adjusting lens 52 for collimating the light beams is necessary. However, due to the limitation of the adjusting lens 52, there should be a proper distance between the reflecting device 51 and the adjusting lens 52 for avoiding that the incident angles of the light beams at two sides, such as the first reflected light beam 511 and the fifth reflected light beam 515, to the adjusting lens 52 are too large so as to achieve the adjusting effect in expectation. Therefore, a proper distance between the reflecting device 51 and the adjusting lens 52 is necessary, which makes the observing device for the three-dimensional flow field occupy a large space. In other words, the design of the second embodiment in FIG. 4 needs a larger space, and thus a modified design of the second embodiment is provided in FIG. 6. The modified embodiment in FIG. 6 is improved in indirectly using the light sheets 41-45 emitted from the light sheet-generating component 53. The emitting direction of the light sheet-generating component 53 is inclined for emitting the light sheets 41-45 to a deflecting-reflecting lens 54 before entering the flow field 3. Based on the above design, the light sheet-generating device 5 can be configured closely beside the flow field 3. Namely, the light sheets 41-45 from the light sheet-generating device 5 are generated in a direction along the sideline outside of the flow field 3, and then enter the flow field 3 through the deflecting-reflecting lens 54. Therefore, the occupied space of the whole observing device in the modified embodiment in FIG. 6 is quite small in comparison with that of the second embodiment in FIG. 4.

Third Embodiment

Figure 7:
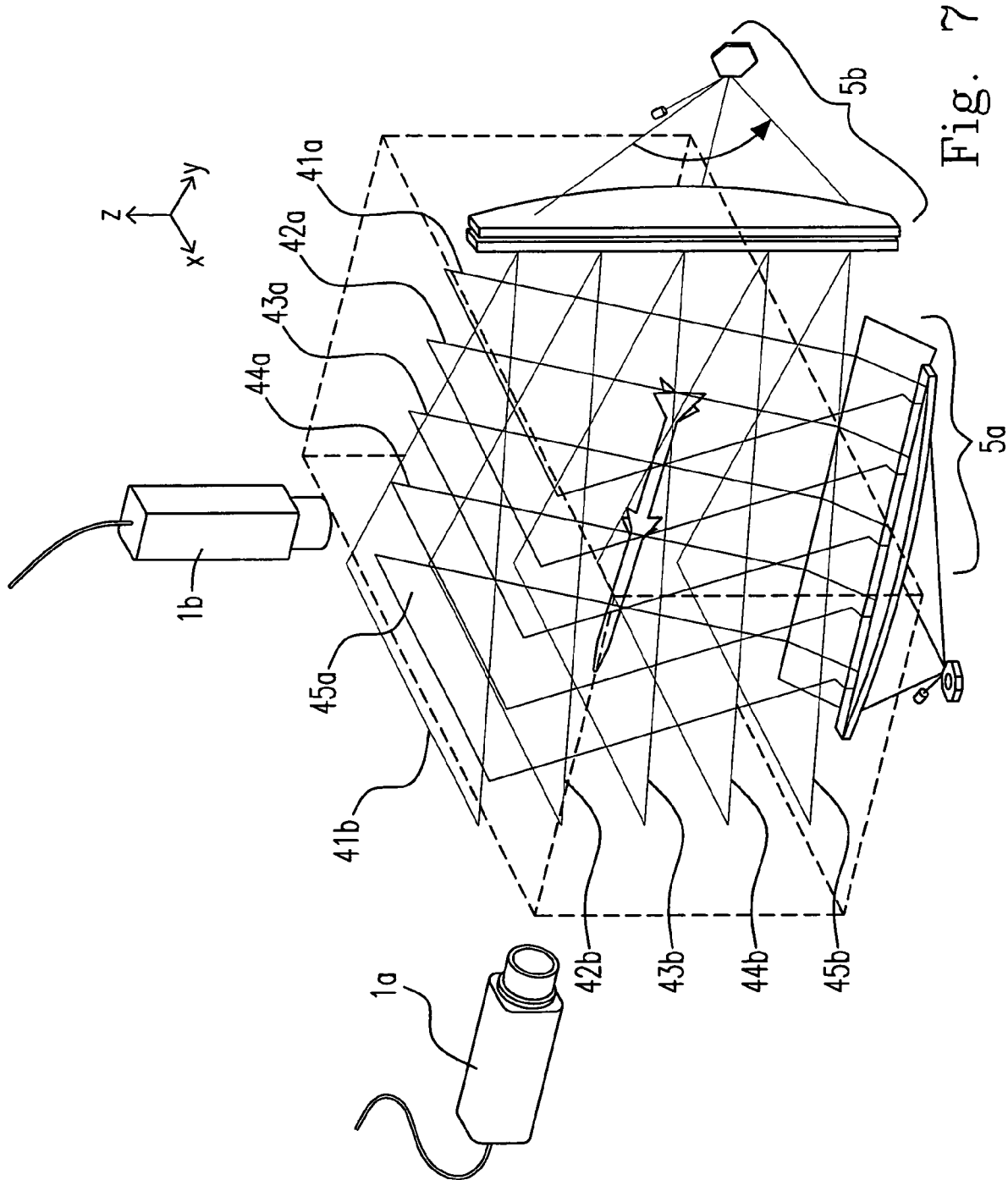
FIG. 7 is a diagram showing an observing device for observing a three-dimensional flow field according to a third embodiment of the present invention.

Please refer to FIG. 7, which is a diagram showing an observing device for observing a three-dimensional flow field according to a third embodiment of the present invention. In this embodiment, the flow field 3 is scanned in two directions, wherein the first direction, i.e. Y-direction, is under the charge of a first camera 1a and the second direction, i.e. Z-direction, is under the charge of a second camera 1b. Since the first camera 1a points at the XZ-plane in Y-direction, light sheets in a first group, including a first light sheet 41a, a second light sheet 42a, a third light sheet 43a, a fourth light sheet 44a and a fifth light sheet 45a, generated by a first light sheet-generating device 5a are all perpendicular to Y-axis. Likewise, Since the second camera 1b points at the XY-plane in Z-direction, light sheets in a second group, including a first light sheet 41b, a second light sheet 42b, a third light sheet 43b, a fourth light sheet 44b and a fifth light sheet 45b, generated by a second light sheet-generating device 5b are all perpendicular to Z-axis. In brief, each light sheet generated by the first light sheet-generating device 5a can be considered as sub-XZ-planes, and each light sheet generated by the second light sheet-generating device 5b can be considered as sub-XY-planes. In this embodiment, the variations of the flow field 3 in two directions could be visualized simultaneously by the two observing devices.

If only the XZ-plane is visualized in Y-direction, it assumes that a flow passes through the sub-XZ plane formed by the third light sheet 43a of the first group in the moment of visualizing that plane, and then the image of the flow passing through the sub-XZ plane is unable to be taken by the first camera 1a. Namely, if the flow field 3 is visualized in Y-direction, the variations of the flow in Y-direction is hard to be detected. Accordingly, another direction for a complete visualization is necessary, such as Z-direction in FIG. 7. In the third embodiment in FIG. 7, when a flow passes through the sub-XZ planes generated by the first light sheet-generating device 5a, the variations of the flow in Z-direction are facile to be detected by the second camera 1b.

Fourth Embodiment

Figure 8:
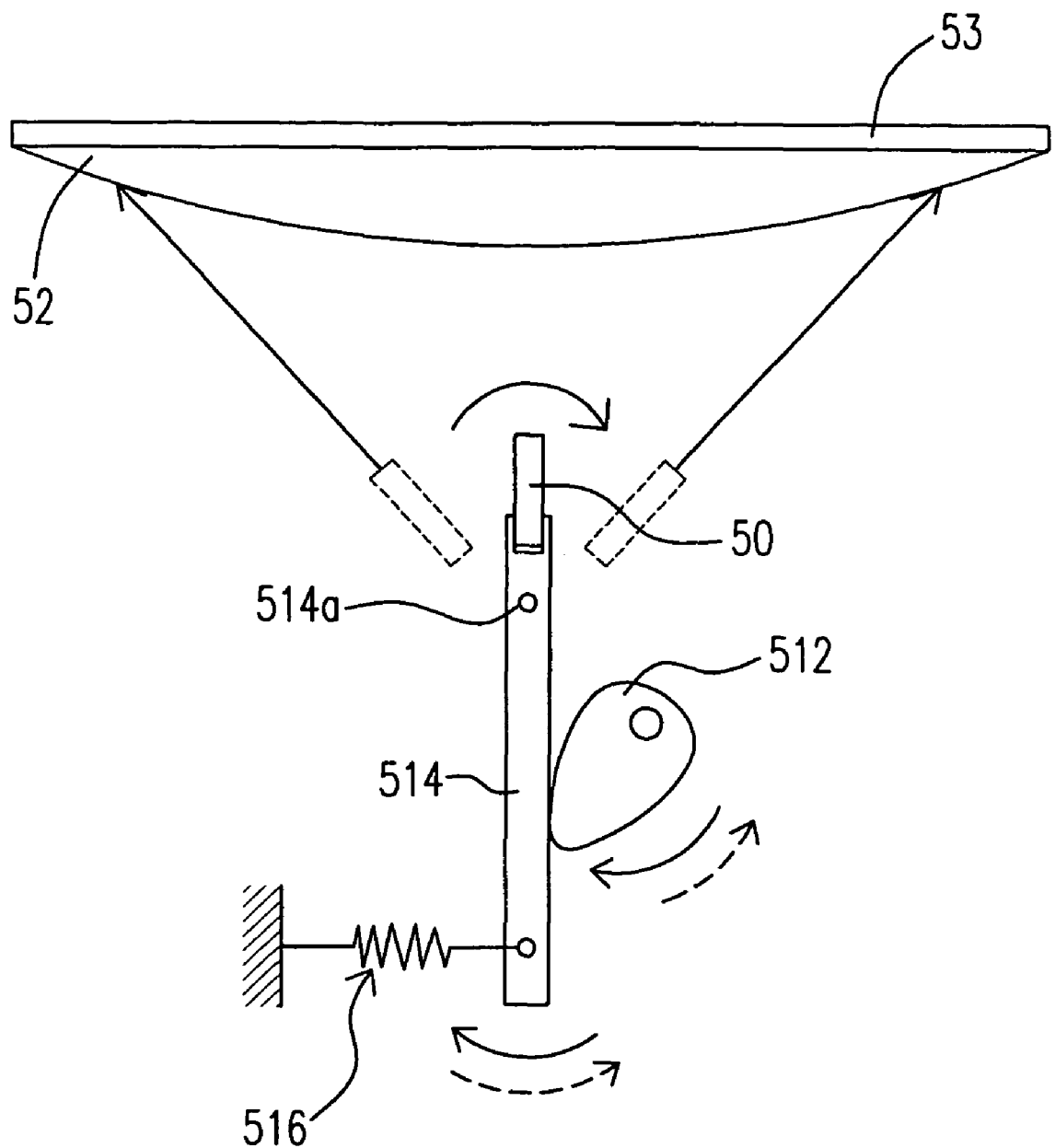
FIG. 8 is a diagram showing an observing device for observing a three-dimensional flow field according to a fourth embodiment of the present invention.

Please refer to FIG. 8, which is a diagram showing an observing device for observing a three-dimensional flow field according to a fourth embodiment of the present invention. In this embodiment, the light-deflecting device is a cam device. The cam device comprises a cam 512 for an eccentric rotation and a follower 514 contacted with the cam 512. The follower 514 is pushed to the cam 512 by an elasticity of an elastic element 516 and is moved via a close contact with the cam. Therefore, due to the contact with the cam 512, the follower 514 is able to reciprocate based on a balance staff 514a, and the light beam from the light source 50 on the follower is able to be emitted to the adjusting lens 52. Finally, the light beams collimated by the adjusting lens 52 are emitted to the light sheet-generating component 53 in parallel.

Fifth Embodiment

Figure 9:
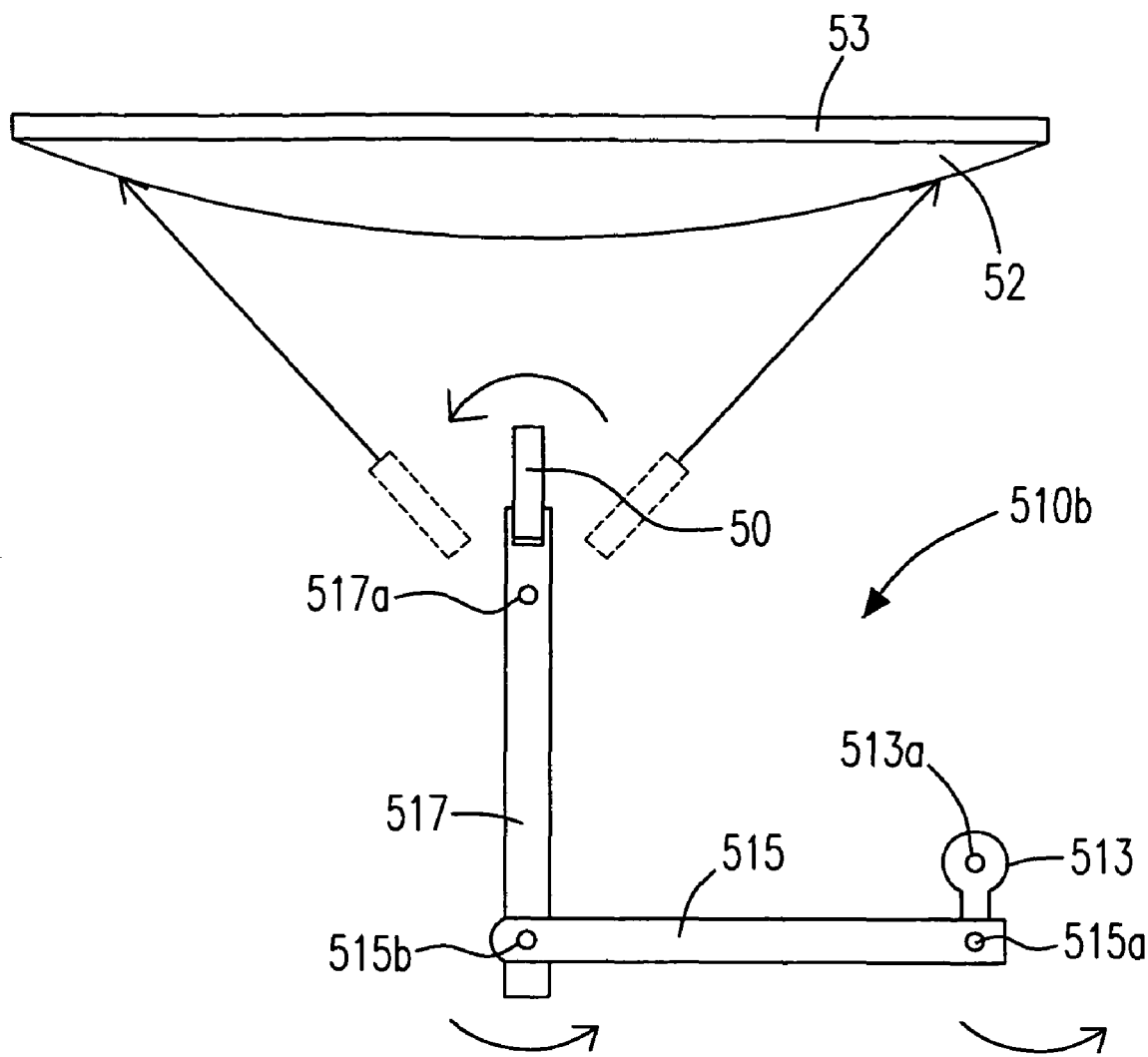
FIG. 9 is a diagram showing an observing device for observing a three-dimensional flow field according to a fifth embodiment of the present invention.

Please refer to FIG. 9, which is a diagram showing an observing device for observing a three-dimensional flow field according to a fifth embodiment of the present invention. In this embodiment, the light-deflecting device is a crank-rocker mechanism. The crank-rocker mechanism comprises a crank 513, which drives a rocker 517 by a connecting rod 515 and comprises a driving shaft 513a generally connected to a motor (not shown). A first terminal 515a of the connecting rod 515 is connected to an eccentric position (i.e. the position of leaving the driving shaft 513a) of the crank 513, and a second terminal 515b thereof is connected to the rocker 517. Therefore, when the crank 513 is rotated, the rocker 517 is able to reciprocate based on a balance staff 517a, and the light beam from the light source 50 configured on the rocker 517 is able to be emitted to the adjusting lens 52. Finally, the light beams collimated by the adjusting lens 52 are emitted to the light sheet-generating component 53 in parallel. According to the above, a driving wheel can be used to achieve the effects of the crank 513 by an eccentric connection with the first terminal 515a of the connecting rod 515.

The various light-deflecting devices mentioned above all can be designed to be synchronous with the focusing systems. When a light beam emitted from the light-deflecting devices, such as the moving device 21 in FIG. 3, the reflecting device 51 in FIG. 4, the follower 514 in FIG. 8 and the rocker 517 in FIG. 9, is emitted to a specific position by an operation of the light-deflecting devices, a light sheet will be generated at a corresponding position in the flow field. Since the operations of the light-deflecting devices and the corresponding positions of the light sheets are anticipated, it is facile for a camera to focus on the light sheets based on the anticipations. It is no more necessary for a camera to detect a distance to a light sheet by a focusing rangefinder thereof, and the focus can be adjusted by moving lenses thereof directly. Based on the above, the focusing speed is improved, and moreover a larger aperture of the camera for absorbing more light by a light-detecting component thereof is allowable, which makes the images taken by the camera sharper.

Sixth Embodiment

Figure 10:
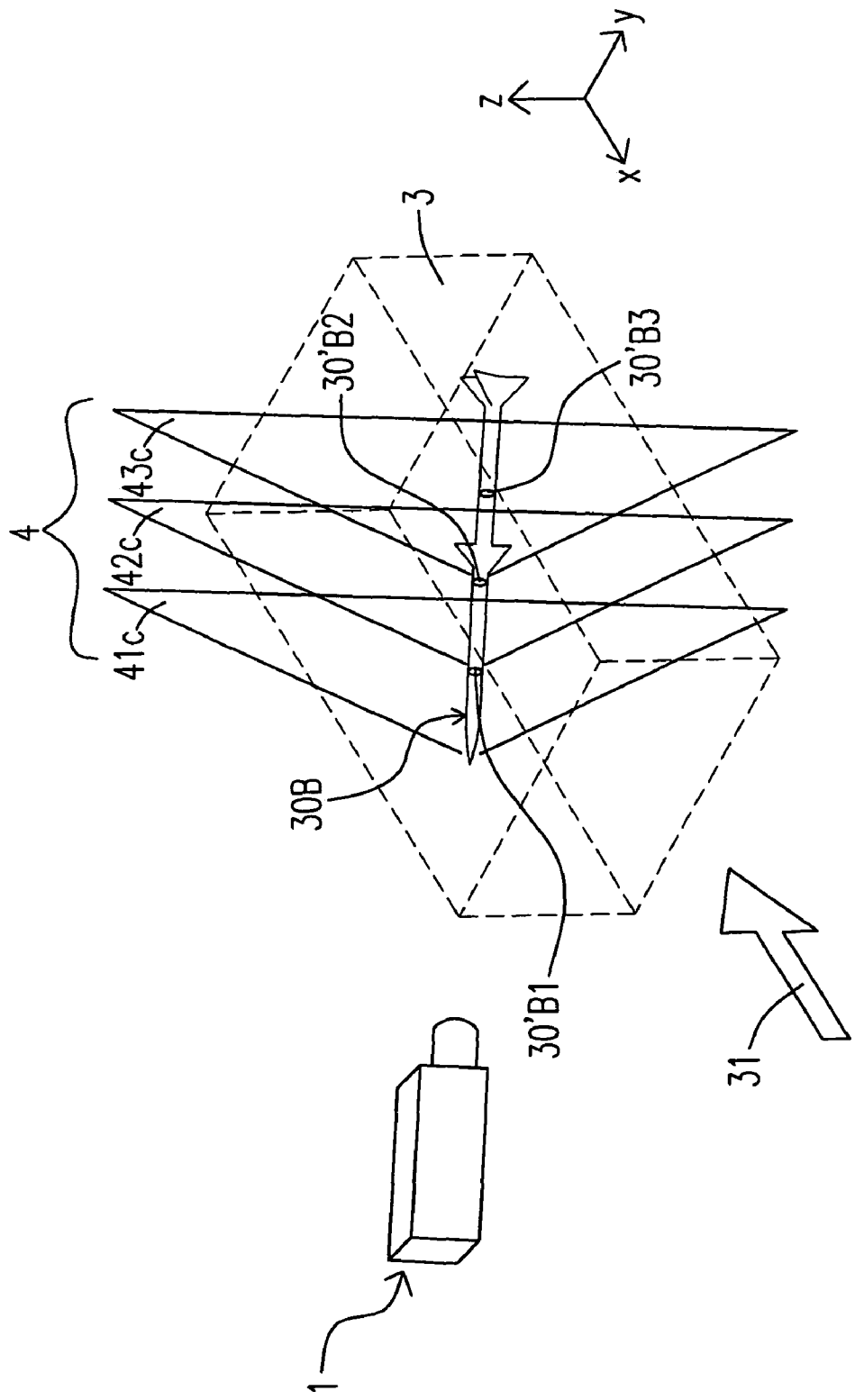
FIG. 10 is a diagram showing an observing device for observing a three-dimensional flow field according to a sixth embodiment of the present invention.
Figure 1:
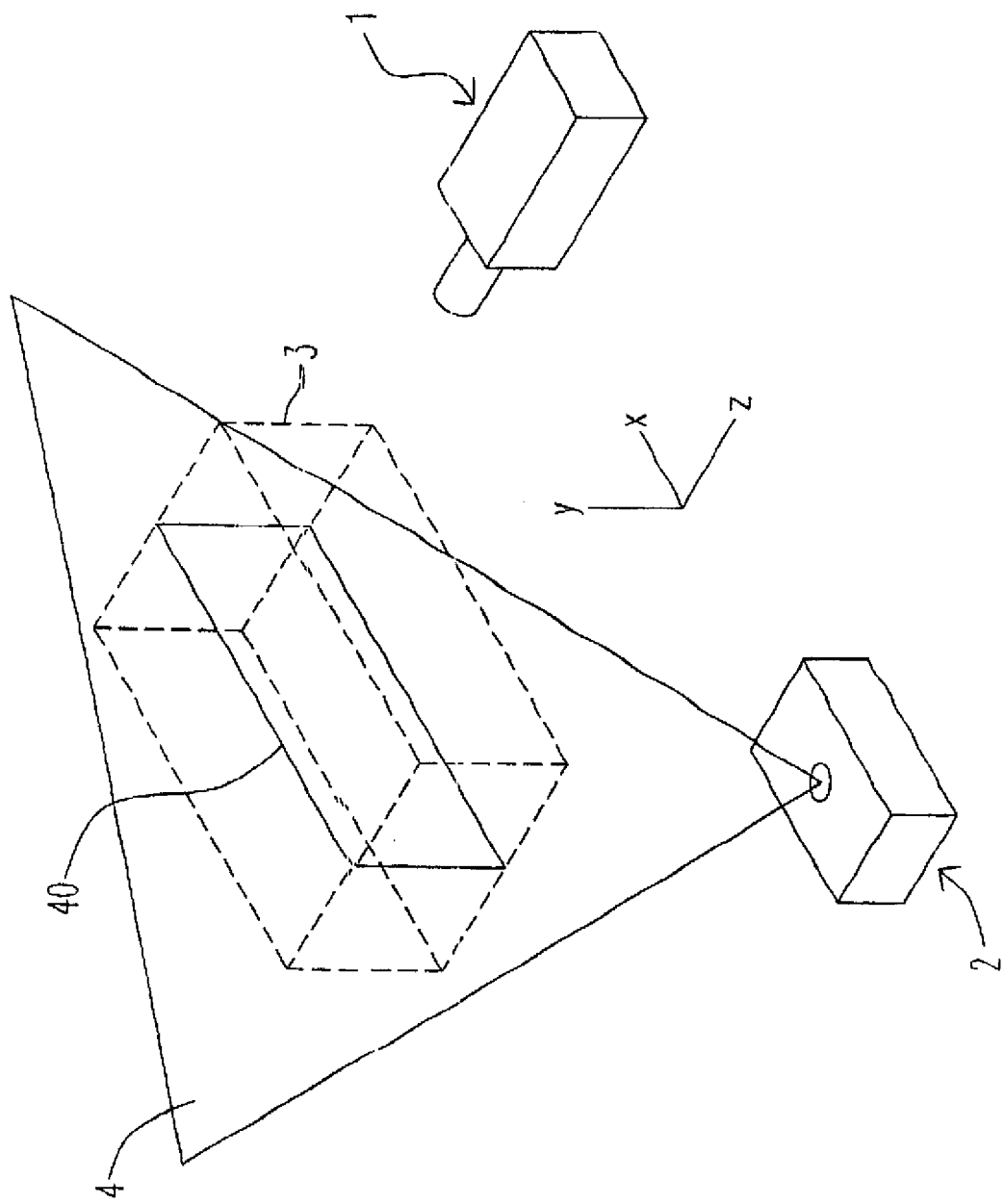
FIG. 1 is a diagram showing an observing device and method for observing a flow field according to the prior art.
Figure 2:
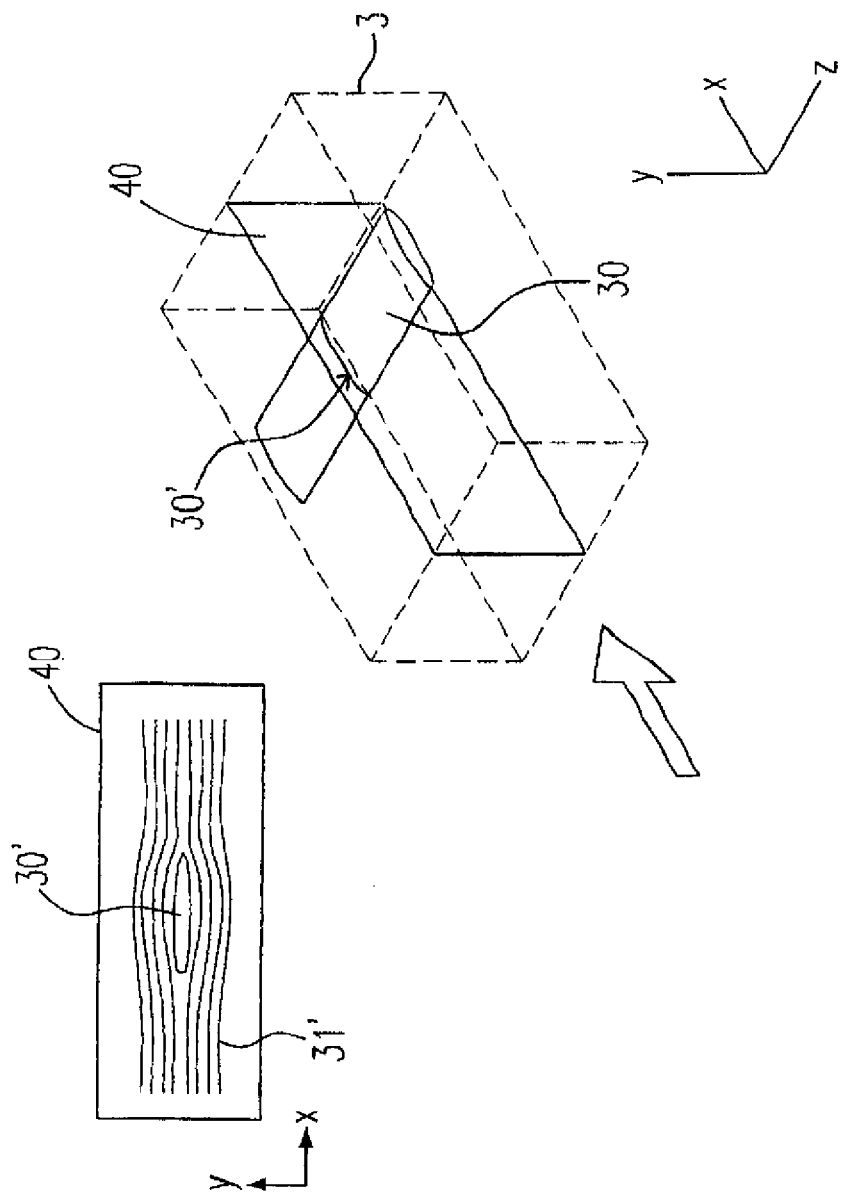
FIG. 2 is a diagram showing the actual operation of the observing device according to FIG. 1.

Please refer to FIG. 10, which is a diagram showing an observing device for observing a three-dimensional flow field according to a sixth embodiment of the present invention. In this embodiment, a test object 30B, which is not parallel to any of X-axis, Y-axis and Z-axis, is put in the flow field 3 with a flow in a flowing direction 31. In order to visualize the flow phenomenon in the axis direction of the test object 30B, the light axis of the camera 1 is adjusted to be parallel to the axis direction of the test object 30B. Since the planes of the light sheets 4 are perpendicular to the light axis of the camera 1, they are perpendicular to the axis direction of the test object 30B as well. The first light sheet 41c, the second light sheet 42c and the third light sheet 43c are respectively perpendicular to the test object 30B and thus form a first section 30'B1, a second section 30'B2 and a third section 30'B3 thereon respectively. Based on the above-mentioned configuration, the flow phenomenon in the axis direction of the test object 30B can be visualized by the camera 1 without being barricaded by the test object 30B itself. If the respective visualizing data of X-axis, Y-axis and Z-axis described above are combined, a more complete visualization and phenomenon regarding the flow field 3 will be obtained.

The concept of the present invention is to scan a three-dimensional flow field by moving a light sheet. Take FIG. 5 for example, the light sheets 41-45 generated in the flow field 3 are parallel to the XY plane and are operated to move along Z-axis direction. Theoretically, there is a plurality of light sheets (XY planes) corresponding to each Z-axis value, and each individual light sheet is separately analyzed. Merging the analyzed data of the plurality of light sheets, the phenomenon, which is visualized in Z-direction, of the three-dimensional flow field 3 is obtained.

Furthermore, take FIG. 7 for example, the phenomenon of the three-dimensional flow field in visualizing directions of Z-axis and Y-axis can be obtained by combining the analyzed data from two cameras 1a and 1b, which is more precise than that obtained from single visualizing direction.

As to the visualizing direction, firstly, the light axis of the camera is perpendicular to the planes of the generated light sheets for confirming that each point on each light sheet can be focused on the light-detecting component inside the camera. Secondly, the visualizing directions are along the three dimensions of the three-dimensional flow field in principle. However, it is usually necessary to visualize the variations of the flow field with the test object configured therein in various gestures, wherein the test object is facile to become a barrier to visualize the flow field. Accordingly, as shown in FIG. 10, the light axis of the camera 1 is adjusted to be parallel to the axis direction of the test object 30B and thereby the variations of the flow around the test object 30B can be visualized almost without any obstruction. If the three dimensions are further taken into account, the analyzed data will be more complete. Based on the foregoing embodiments, it is known that the present invention has a great contribution to the three-dimensional visualization of a flow field.

While the invention has been described in terms of what is presently considered to be the most practical and preferred embodiments, it is to be understood that the invention needs not be limited to the disclose embodiments. Therefore, it is intended to cover various modifications and similar arrangements included within the spirit and scope of the appended claims, which are to be accorded with the broadest interpretation so as to encompass all such modifications and similar structures.

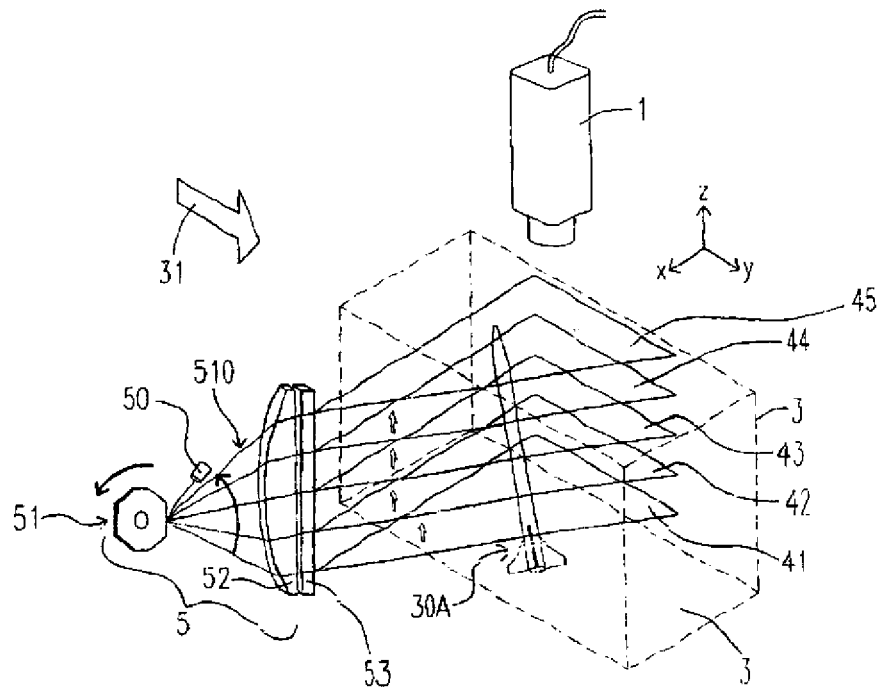

What is claimed is:

1. An observing device for observing a flow field in a detection space, comprising:
   a light source generating a light beam;
   a light-deflecting device deflecting the light beam; and
   a light sheet-generating component receiving the light beam deflected by the light-deflecting device and generating a light sheet in the detection space corresponding to the deflected light beam.

2. An observing device as claimed in claim 1, further comprising:
   an adjusting lens configured between the light-deflecting device and the light sheet-generating component to collimate the light beam deflected by the light-deflecting device; and
   an image detector readjusting a focus thereof according to a distance from the image detector to the light sheet for recording an image of the flow.

3. An observing device as claimed in claim 1, wherein the light sheet traverses an object in the detection space, and the light-deflecting device comprises a reflecting device for deflecting the light beam by moving the reflecting device.

4. An observing device as claimed in claim 3, wherein the reflecting device comprises:
   a rotator; and
   a plurality of reflecting mirrors surrounding the rotator for deflecting the light beam by rotating the rotator.

5. An observing device as claimed in claim 4, wherein the plurality of reflecting mirrors is parallel to tangent lines of a perimeter of the rotator.

6. An observing device as claimed in claim 1, wherein the light-deflecting device comprises a cam and the light source is configured thereon for deflecting the light beam by revolving the cam.

7. An observing device as claimed in claim 1, wherein the light-deflecting device comprises a cam and a rocker arm, the cam is contacted with the rocker arm and the light source is configured on the rocker arm so as to deflect the light beam by revolving the cam.

8. An observing device as claimed in claim 1, further comprising:
   a rocker arm with the light source configured thereon;
   a connecting rod; and
   a drive wheel connected to the rocker arm through the connecting rod for reciprocating the rocker arm by rotating the drive wheel.

9. An observing device for observing a flow in a detection space, comprising:
- a light sheet generator for generating a light sheet in the detection space; and
- a moving device connected with the light sheet generator for moving the light sheet generator along a direction, thereby the light sheet is produced along the direction.

10. An observing device as claimed in claim 9, further comprising:
- an image detector readjusting a focus thereof according to a distance from the image detector to the light sheet for recording an image of the flow.

11. An observing device as claimed in claim 10, wherein the image detector is positioned for facing the light sheet.

12. An observing device as claimed in claim 10, wherein the focus of the image detector is synchronously readjusted to comply with a movement of the light sheet generator.

13. An observing device as claimed in claim 9, wherein the light sheet traverses an object in the detection space, and the moving device comprises a track for moving the light sheet generator.

14. An observing device as claimed in claim 9, wherein the direction is perpendicular to the light sheet.

15. An observing device as claimed in claim 9, wherein the direction is perpendicular to a flowing direction of the flow.

16. A method for scanning a flow in a detection space, comprising steps of:
- generating a light sheet in the detection space; and
- scanning the detection space by successively producing the light sheet along a direction.

17. A method as claimed in claim 16, further comprising steps of:
- providing a light sheet generator; and
- providing a collimated light beam to the light sheet generator along the direction for successively producing the light sheet, wherein the light sheet travers an object in the detection space.

18. A method as claimed in claim 17, further comprising a step of:
- moving the light sheet generator along the direction parallel to a flowing direction of the flow so as to successively produce the light sheet along the direction.

19. A method as claimed in claim 16, further comprising steps of:
- providing an image detector; and
- recording the scanning of the detection space by using the image detector for obtaining an image of the flow.

20. A method as claimed in claim 19, further comprising a step of:
- readjusting a focus of the image detector when the light sheet is successively produced during the scanning period of the detection space.

* * * * *

UNITED STATES PATENT AND TRADEMARK OFFICE
CERTIFICATE OF CORRECTION

| | | |
|---|---|---|
| PATENT NO. | : 7,952,782 B2 | |
| APPLICATION NO. | : 12/214750 | |
| DATED | : May 31, 2011 | |
| INVENTOR(S) | : Po-Hsuan Huang | |

It is certified that error appears in the above-identified patent and that said Letters Patent is hereby corrected as shown below:

Delete the title page and substitute therefore the attached title page displaying the corrected illustrative figure and number of drawing sheets in patent.

Delete Drawing Sheets 1-7 and substitute therefore the attached Drawing Sheets 1-6 consisting of new FIGS 1-6.

Signed and Sealed this
Twenty-ninth Day of November, 2011

David J. Kappos
*Director of the United States Patent and Trademark Office*

CERTIFICATE OF CORRECTION (continued)

(12) United States Patent
Huang

(10) Patent No.: US 7,952,782 B2
(45) Date of Patent: May 31, 2011

(54) OBSERVING DEVICE AND METHOD TO OBSERVE A THREE-DIMENSIONAL FLOW FIELD

(75) Inventor: Po-Hsuan Huang, Taipei (TW)

(73) Assignee: National Applied Research Laboratories, Taipei (TW)

(*) Notice: Subject to any disclaimer, the term of this patent is extended or adjusted under 35 U.S.C. 154(b) by 406 days.

(21) Appl. No.: 12/214,750

(22) Filed: Jun. 19, 2008

(65) Prior Publication Data
US 2009/0231660 A1  Sep. 17, 2009

(30) Foreign Application Priority Data
Feb. 21, 2008 (TW) .................. 97106154 A

(51) Int. Cl.
*G02B 26/08* (2006.01)

(52) U.S. Cl. .................................................. 359/216.1
(58) Field of Classification Search ........... 359/216.1; 250/559.25, 234–236
See application file for complete search history.

(56) References Cited

U.S. PATENT DOCUMENTS
5,945,685 A * 8/1999 Imaino et al. ........... 250/559.45
* cited by examiner

*Primary Examiner* — Euncha P Cherry
(74) *Attorney, Agent, or Firm* — Haverstock & Owens LLP

(57) ABSTRACT

An observing device for observing a flow field in a detection space is provided. The observing device includes a light source generating a light beam, a light-deflecting device deflecting the light beam, and a light sheet-generating component receiving the light beam deflected by the light-deflecting device and generating a light sheet in the detection space corresponding to the deflected light beam.

20 Claims, 6 Drawing Sheets